(12) United States Patent
Sasaki et al.

(10) Patent No.: US 9,438,909 B2
(45) Date of Patent: Sep. 6, 2016

(54) MOVING IMAGE ENCODING METHOD AND MOVING IMAGE ENCODING DEVICE

(71) Applicant: Panasonic Corporation, Osaka (JP)

(72) Inventors: Yoshimitsu Sasaki, Kyoto (JP); Shinji Kitamura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 717 days.

(21) Appl. No.: 13/868,152

(22) Filed: Apr. 23, 2013

(65) Prior Publication Data

US 2013/0235937 A1 Sep. 12, 2013

Related U.S. Application Data

(63) Continuation of application No. PCT/JP2011/004081, filed on Jul. 19, 2011.

(30) Foreign Application Priority Data

Nov. 2, 2010 (JP) ................................ 2010-246081

(51) Int. Cl.
*H04N 7/36* (2006.01)
*H04N 19/583* (2014.01)
(Continued)

(52) U.S. Cl.
CPC ...... *H04N 19/00733* (2013.01); *H04N 19/105* (2014.11); *H04N 19/114* (2014.11); *H04N 19/573* (2014.11); *H04N 19/61* (2014.11); *H04N 19/112* (2014.11); *H04N 19/57* (2014.11)

(58) Field of Classification Search
CPC ..................... H04N 19/00733; H04N 19/105; H04N 19/112; H04N 19/114; H04N 19/57; H04N 19/573; H04N 19/61
See application file for complete search history.

(56) References Cited

U.S. PATENT DOCUMENTS 5,566,002 A 10/1996 Shikakura
8,000,392 B1 * 8/2011 Krupiczka ............. H04N 19/56
375/240.12
(Continued)

FOREIGN PATENT DOCUMENTS

JP 04-326255 11/1992
JP 2002-034047 1/2002
(Continued)

OTHER PUBLICATIONS

International Search Report of PCT Application No. PCT/JP2011/004081 dated Oct. 25, 2011.
(Continued)

*Primary Examiner* — Mohammed Rahaman
(74) *Attorney, Agent, or Firm* — McDermott Will & Emery LLP

(57) ABSTRACT

A moving image encoding device that divides a moving image signal into a plurality of macroblocks and encodes a difference between each of the macroblocks into which the moving image signal is divided and a motion compensated prediction image includes a prediction processing section configured to perform prediction processing on a plurality of moving image signals, and a control section configured to instruct, when prediction processing for a first moving image signal and prediction processing for a second moving image signal whose frame rate is smaller than a frame rate of the first moving image signal are simultaneously performed, the prediction processing section to reduce an arithmetic amount regarding prediction processing only for the first moving image signal.

16 Claims, 14 Drawing Sheets

(51) Int. Cl.
*H04N 19/105* (2014.01)
*H04N 19/61* (2014.01)
*H04N 19/114* (2014.01)
*H04N 19/573* (2014.01)
*H04N 19/112* (2014.01)
*H04N 19/57* (2014.01)

(56) References Cited

U.S. PATENT DOCUMENTS

2002/0037052 A1 3/2002 Kimura et al.
2008/0247461 A1* 10/2008 Nishida ............... H04N 19/172
375/240.03
2009/0052551 A1* 2/2009 Kitamura ....... H04N 21/234381
375/240.26

FOREIGN PATENT DOCUMENTS

JP 2007-006210 1/2007
JP 2008-016914 1/2008
WO 2006/033227 3/2006

OTHER PUBLICATIONS

English translation of the Chinese Office Action dated Nov. 4, 2015, issued in corresponding Chinese Patent Application No. 201180049912.2.

* cited by examiner

PICTURE STRUCTURE: FIELD STRUCTURE
FRAME RATE: 30 fps
GOP STRUCTURE: PBB
REFERENCE IMAGE NUMBER: P PICTURE 2 IMAGES
　　　　　　　　　　　　 B PICTURE 4 IMAGES PICTURE STRUCTURE: FIELD STRUCTURE
FRAME RATE: 15 fps
GOP STRUCTURE: PBB
REFERENCE IMAGE NUMBER: P PICTURE 1 IMAGE
　　　　　　　　　　　　 B PICTURE 2 IMAGES

FIG.7

| STREAM NUMBER | 1 | 2 | 3 | 4 | ... |
|---|---|---|---|---|---|
| SEARCH RANGE | 200x100 | 150x75 | 100x50 | 50x25 | ... |
| MACROBLOCK SIZE | 16x16<br>16x8<br>8x16<br>8x8<br>8x4<br>4x8<br>4x4 | 16x16<br>16x8<br>8x16<br>8x8 | 16x16<br><br><br>8x8 | 16x16 | ... |
| INTRA PREDICTION MODE | 9 MODES<br>ALL MODES | 8 MODES<br>OTHER THAN<br>Mode 3 | 4 MODES<br>Modes 0, 1, 2,<br>AND 4 | 3 MODES<br>Modes 0, 1,<br>AND 2 | ... |

| REFERENCE IMAGE POSITION | NUMBER OF SELECTED MACROBLOCKS | ORDER |
|---|---|---|
| L0-0 | 50 | 4 |
| L0-1 | 100 | 1 |
| L1-0 | 70 | 2 |
| L1-1 | 60 | 3 | ated on Jul. 19, 2011, which claims
MOVING IMAGE ENCODING METHOD AND MOVING IMAGE ENCODING DEVICE

CROSS-REFERENCE TO RELATED APPLICATIONS

This is a continuation of PCT International Application PCT/JP2011/004081 filed on Jul. 19, 2011, which claims priority to Japanese Patent Application No. 2010-246081 filed on Nov. 2, 2010. The disclosures of these applications including the specifications, the drawings, and the claims are hereby incorporated by reference in their entirety.

BACKGROUND

The present disclosure relates to a moving image encoding method, and more particularly, relates to a moving image encoding method for compression encoding a plurality of moving image signals and a moving image encoding device.

As methods for encoding a moving image signal, there have been two encoding methods. A first one is a method in which spatial redundancy in a single frame is reduced and compression is performed and is called intra encoding. A second one is a method in which temporal redundancies in a plurality of frames are reduced and compression is performed and is called inter encoding.

Intra encoding is normally performed in micro block unit. In the intra encoding, a prediction image is generated from a peripheral image of each target micro block that is to be encoded in accordance with a corresponding prediction mode, a prediction mode in which a difference is the smallest is determined, the difference is encoded to reduce spatial redundancy. Therefore, as the number of types of prediction modes increases, the amount of processing increases.

Inter encoding is normally performed in macro block unit. In the inter encoding, block matching between a target macro block that is to be encoded and a reference image formed of an image separated from the target macro block by one field or more is performed for each micro block, a macro block with a small difference is searched, the difference is encoded, and temporal redundancy is reduced. A great number of arithmetic processings are required for this search.

Thus, a correct prediction image can be achieved by precisely generating a prediction image, thereby improving image quality. However, whether the intra encoding or the inter encoding is performed, a large arithmetic processing amount is required.

Also, there are an increasing number of applications that require simultaneous compression of a plurality of moving images. When a plurality of moving image signals are handled, the above-described processings have to be simultaneously performed on the moving image signals. Thus, the processing amount of prediction processing increases in accordance with the number of moving image signals to be handled. In the worst case, prediction processing cannot be performed in time and, disadvantageously, a prediction image might not be produced.

In order to avoid the above-described case, when a plurality of moving image signals are handled, a processing amount of compression processing for each moving image signal has to be controlled.

In International Publication No. 2006/033227, an proposal for the above-described problem has been raised. As illustrated in FIG. 14, a moving image encoding device 1400 that compression-encodes a plurality of moving image signals includes a signal number obtaining section 1410 that obtains the number of target moving image signals that correspond to input moving image signals in number and are to be encoded, a moving image obtaining section 1420 that obtains one or more of the target moving image signals that are to be encoded, a processing method specifying section 1430 that specifies a processing method for encoding processing which affects an arithmetic amount of the encoding processing, i.e., for example, a processing method regarding an upper limit of reference image frame number, and a motion vector search range, etc. in accordance with the number of moving image signals obtained by the signal number obtaining section 1410 such that as the number of the moving image signals increases, the arithmetic amount reduces, and an encoding section 1440 that performs encoding processing on the one or more moving image signals obtained by the moving image obtaining section 1420 and performs, if the number of the obtained moving image signals is plural, encoding processing on each of the obtained moving image signals on a time division basis. The encoding section 1440 is configured to perform encoding processing using a processing method specified by the processing method specifying section 1430.

In a motion prediction section 1442, motion prediction is performed in a search range sent from a motion prediction processing specifying section 1431. In this case, when the number of the moving image signals from the signal number obtaining section 1410 increases, the search range is limited to a small range.

In an intra encoding section 1443, intra prediction is performed in accordance with an intra prediction mode sent from an intra encoding processing method specifying section 1432. In this case, as the number of the moving image signals increases, the number of intra prediction modes is limited to a small number.

In a quantization section 1445, processing is executed by a quantization step sent from a quantization step size specifying section 1433. In this case, when the number of the moving image signals increases, the quantization step is limited to a small quantization step.

A variable-length encoding section 1446 operates in an encoding mode sent from a variable-length encoding processing specifying section 1434. In this case, when the number of the moving image signals increases, the variable-length encoding section 1446 operates in an encoding mode in which variable-length encoding is not performed.

As described above, when the number of the moving image signals increases, encoding processing is executed in a limited mode in order to reduce a processing amount of prediction processing (see, for example, International Publication No. 2006/033227).

These technologies are for use in recording devices, such as a digital versatile disc (DVD) or the like, which records programs of a plurality of television channels. In these technologies, the frame rates of handled input moving image signals are the same, a processing method that is to be used for a case in which there is no priority order for image qualities of the input moving image signals is adopted, and thus, the arithmetic amount of prediction processing for each of all moving image signals is disadvantageously reduced.

SUMMARY

In recent years, since there are enhanced crime prevention consciousness and increased demands for communication, an increasing number of network cameras and security cameras have installed in households. Such an application has a function of distributing moving image signals to a plurality of display devices or a function of displaying a plurality of moving image signals on a signal display device, and thus, a plurality of moving image signals have to be compressed. In many cases, for a moving image signal serving as a major moving image signal, a frame rate used for maintain high image quality is set to be high, while, for another moving image signal serving as a sub moving image signal, a field angle is small and a frame rate is set to be small.

However, in a method according to International Publication No. 2006/033227, it is assumed that moving image signals having the same field angle and the same frame rate are handled and, if the method of International Publication No. 2006/033227 is used when moving image signals having different frame rates are received, a processing amount of prediction processing performed on all moving image signals that are simultaneously handled is reduced. Therefore, the method of International Publication No. 2006/033227 cannot be applied to an application in which high quality is maintained for the moving image signal serving as a major moving image signal and the image quality of the moving image signal serving as a sub moving image signal is not questioned so much.

In view of the above-described points, according to aspects of the present disclosure, a plurality of moving image signals may be simultaneously compression-encoded while high image quality of the moving image signals that are compression-encoded may be maintained.

In order to solve the above-described problem, the present disclosure provides the following configurations. For example, in a moving image encoding method including dividing a moving image signal into a plurality of macroblocks, and encoding a difference between each of the macroblocks into which the moving image signal is divided and a motion compensated prediction image, when prediction processing for a first moving image signal and prediction processing for a second moving image signal whose frame rate is smaller than a frame rate of the first moving image signal are simultaneously performed, an arithmetic amount is reduced only for the first moving image signal and prediction processing is performed.

Thus, even when timings of prediction processings for two moving image signals overlap with each other, for one of the moving image signals having a smaller frame rate, prediction processing may be performed with a normal arithmetic amount. When the timings of prediction processings do not overlap with each other, for one of the moving image signals having a greater frame rate, the prediction processing may be performed with a normal arithmetic amount. Therefore, even when a plurality of moving image signals are simultaneously compression-encoded.

For example, the moving image encoding method includes changing, in order not to simultaneously perform P picture prediction processing for the first moving image signal and the prediction processing for the second moving image signal, a group of pictures (GOP) structure in accordance with the P picture prediction processing.

Thus, in one of the moving image signals having a greater frame rate, prediction processing is performed on a P picture with a normal arithmetic amount, and thus, degradation of image quality of the P picture may be reduced.

According to aspects of the present disclosure, the image quality of a moving image signal which is compression-encoded may be maintained excellent, and a plurality of moving image signals may be simultaneously compression-encoded.

BRIEF DESCRIPTION OF THE DRAWINGS

FIG. 7 is an example prediction mode table used in prediction processing.

DETAILED DESCRIPTION

Prediction control processing and reference image determination processing in prediction processing according to the present disclosure will be described with reference to the accompanying drawings.

<First Prediction Control Processing>

Figure 1:
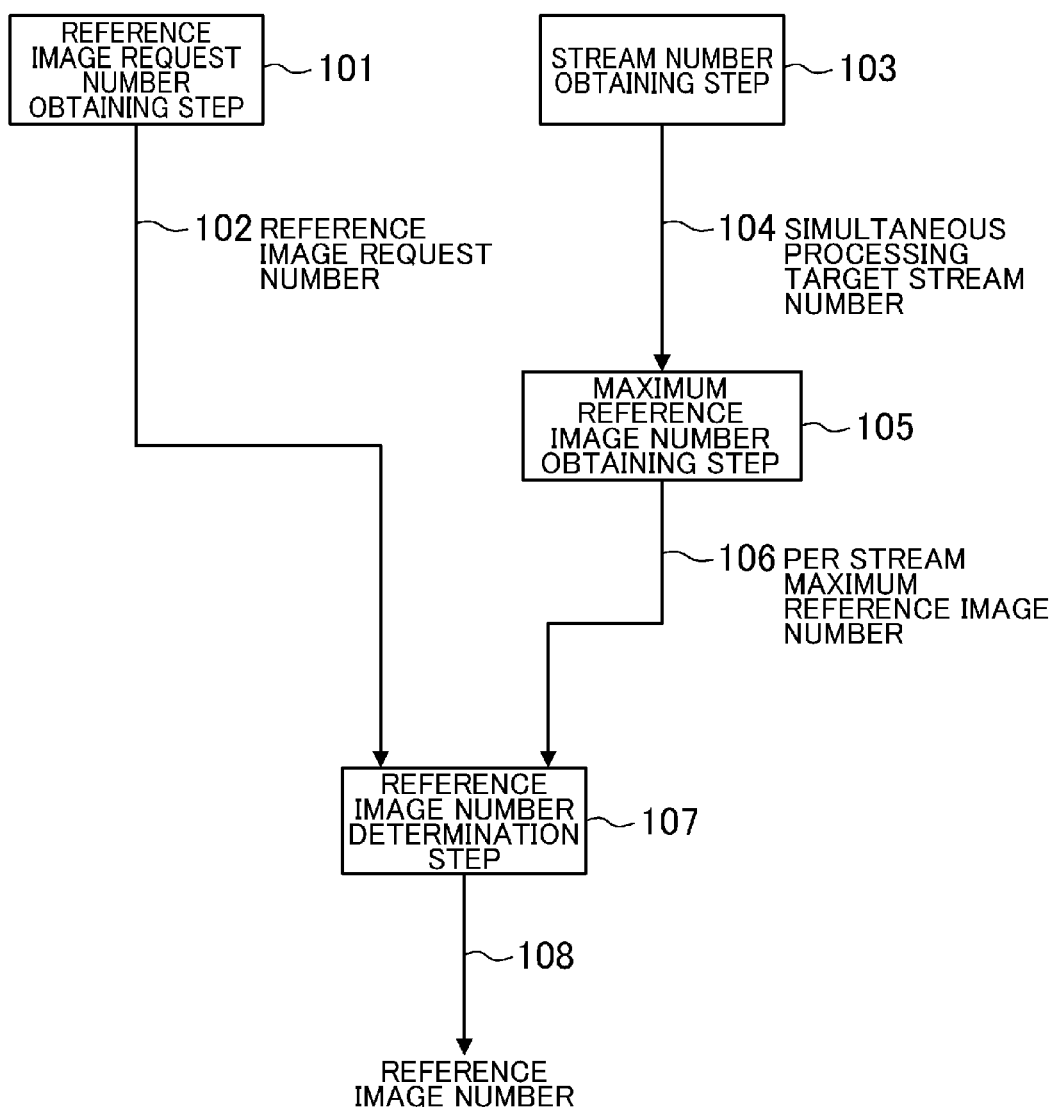
FIG. 1 is a schematic diagram illustrating an example prediction control processing according to the present disclosure.

FIG. 1 is a schematic diagram illustrating an example prediction control according to the present disclosure. As illustrating in FIG. 1, the prediction control processing includes a reference image request number obtaining step 101 of calculating a reference image request number representing a number of reference images necessary for prediction processing and outputting a reference image request number 102, a stream number obtaining step 103 of obtaining a number of moving image signals (which will be hereinafter referred to as "streams") on which prediction processing is simultaneously performed and outputting a simultaneous processing target stream number 104, a maximum reference image number obtaining step 105 of receiving the simultaneous processing target stream number 104 as an input, calculating a maximum reference image number, i.e., a maximum number of reference images that are referable in the prediction processing, and outputting a per stream maximum reference image number 106, and a reference image number determination step 107 of receiving the reference image request number 102 and the per stream maximum reference image number 106 as inputs and outputting a reference image number 108.

Figure 2A:
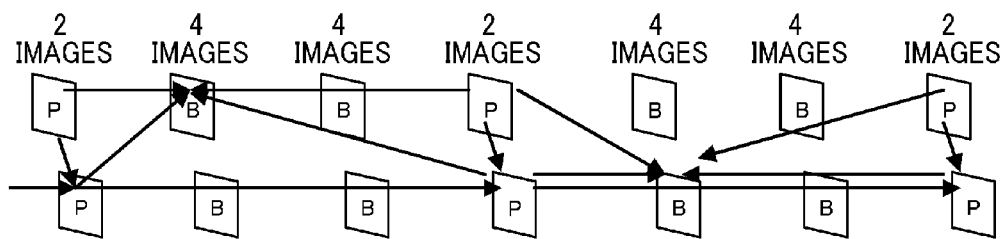
FIGS. 2A and 2B are diagrams illustrating an example input stream.
Figure 2B:
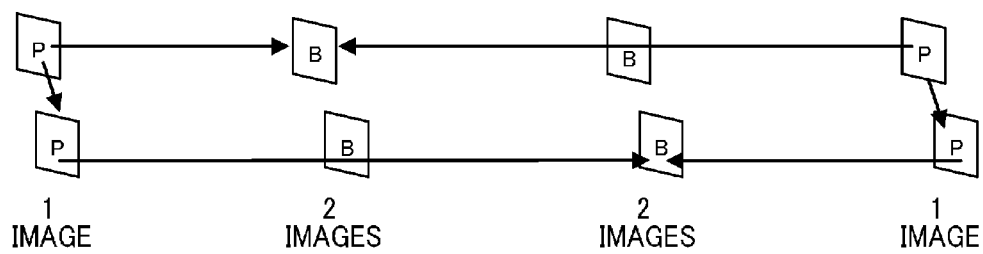

A case will be described as an example in which, when, as illustrated in FIG. 2A, a first stream, as a field structure, having a GOP structure in which a P picture includes two fields, a B picture includes four fields, the reference image number of the P picture is "2," and the reference image number of the B picture is "4" is compression-encoded at a frame rate of 30 fps (frame per second), as illustrated in FIG. 2B, a request for compression-encoding, at a frame rate of 15 fps, a second stream, as a field structure, having a GOP structure in which a P picture includes two fields, a B picture includes four fields, the reference image number of the P picture is "1," and the reference image number of the B picture is "2" is received.

In the maximum reference image number obtaining step 105, before starting prediction processing, as the maximum reference image number, "2" is set for the P picture, and "4" is set for the B picture. These numbers may be held in a read only memory (ROM) and, alternatively, may be set in a register that is externally variable.

Figure 3:
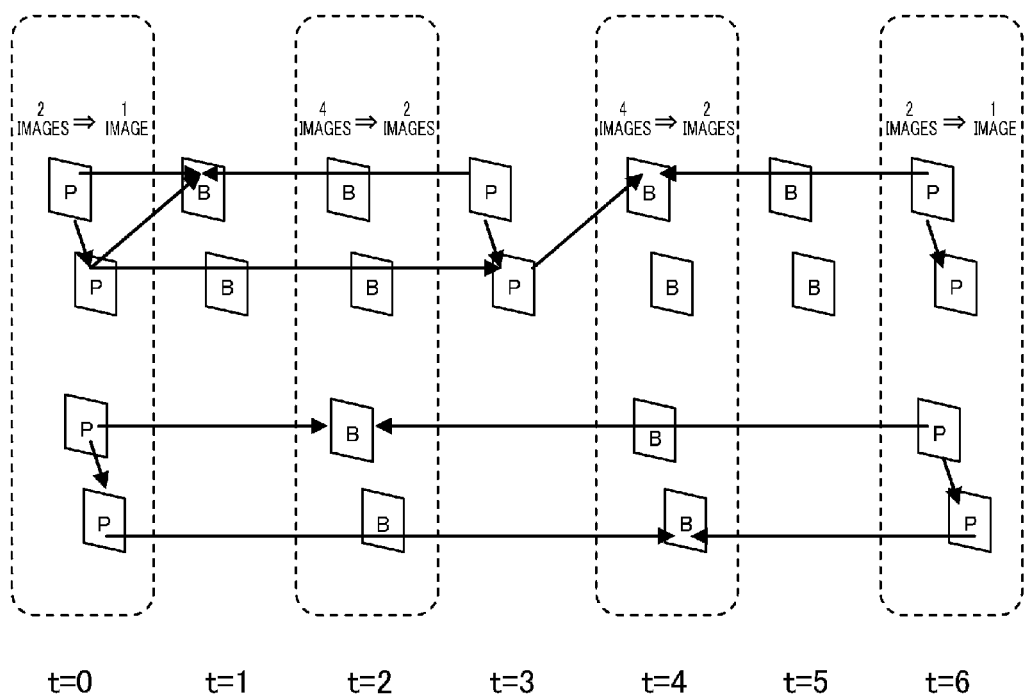
FIG. 3 is a pattern diagram illustrating the prediction control processing of FIG. 1.

FIG. 3 is a diagram illustrating a case in which the reference image number is varied in prediction processing, and illustrates variation of the reference image number of the first stream caused when a request for the second stream is made. A reference image number determination method at each processing time in FIG. 3 will be hereinafter described.

First, processing performed at processing time t=0 and t=6 will be described. In this case, prediction processing for the P picture of the first stream and prediction processing for the P picture of the second stream are simultaneously performed, and therefore, "2" is outputted as the simultaneous processing target stream number 104.

In the maximum reference image number obtaining step 105, since the maximum reference image number of the P picture is "2" and prediction processing is performed simultaneously on two streams, "1" is outputted as the per stream maximum reference image number 106.

When prediction processing is performed on the P picture of the first stream, "2" is received as the reference image request number 102 from the reference image request number obtaining step 101. However, since the per stream maximum reference image number 106 is "1," the reference image number 108 is reduced to "1."

When prediction processing is performed on the P picture of the second stream, "1" is received as the reference image request number 102. Since the per stream maximum reference image number 106 is "1," "1" is outputted as the reference image number 108.

Next, processing performed at the processing time t=1 and t=5 will be described. In this case, prediction processing is performed only on the B picture of the first stream, and therefore, "1" is outputted as the simultaneous processing target stream number 104.

In the maximum reference image number obtaining step 105, since the maximum reference image number of the B picture is "4" and prediction processing is performed only on "1" stream, "4" is outputted as the per stream maximum reference image number 106.

When prediction processing is performed on the B picture of the first stream, "4" is received as the reference image request number 102 from the reference image request number obtaining step 101. Since the per stream maximum reference image number 106 is "4," "4" is outputted as the reference image number 108.

Processing performed at the processing time t=2 and t=4 will be described. In this case, prediction processing for the B picture of the first stream and prediction processing for the B picture of the second stream are simultaneously performed, and therefore, "2" is outputted as the simultaneous processing target stream number 104.

In the maximum reference image number obtaining step 105, since the maximum reference image number of the B picture is "4" and prediction processing is performed simultaneously on "2" streams, "2" is outputted as the per stream maximum reference image number 106.

When prediction processing is performed on the B picture of the first stream, "4" is received as the reference image request number 102 from the reference image request number obtaining step 101. However, since the per stream maximum reference image number 106 is "2," the reference image number 108 is reduced to "2."

When prediction processing is performed on the B picture of the second stream, "2" is received as the reference image request number 102. Since the per stream maximum reference image number 106 is "2," "2" is outputted as the reference image number 108.

Processing performed at the processing time t=3 will be described. In this case, prediction processing is performed only on the P picture of the first stream, and therefore, "2" is outputted as the per stream maximum reference image number 106.

When prediction processing is performed on the P picture of the first stream, "2" is received as the reference image request number 102 from the reference image request number obtaining step 101. Since the per stream maximum reference image number 106 is "2," "2" is outputted as the reference image number 108.

When prediction processing is performed simultaneously at a time by the above-described prediction control processing, the reference image number is reduced, but for other cases, the reference image number is not reduced. Thus, compression-encoding of a stream may be realized while degradation of the image quality is kept to a minimum.

<Second Prediction Control Processing>

Figure 4:
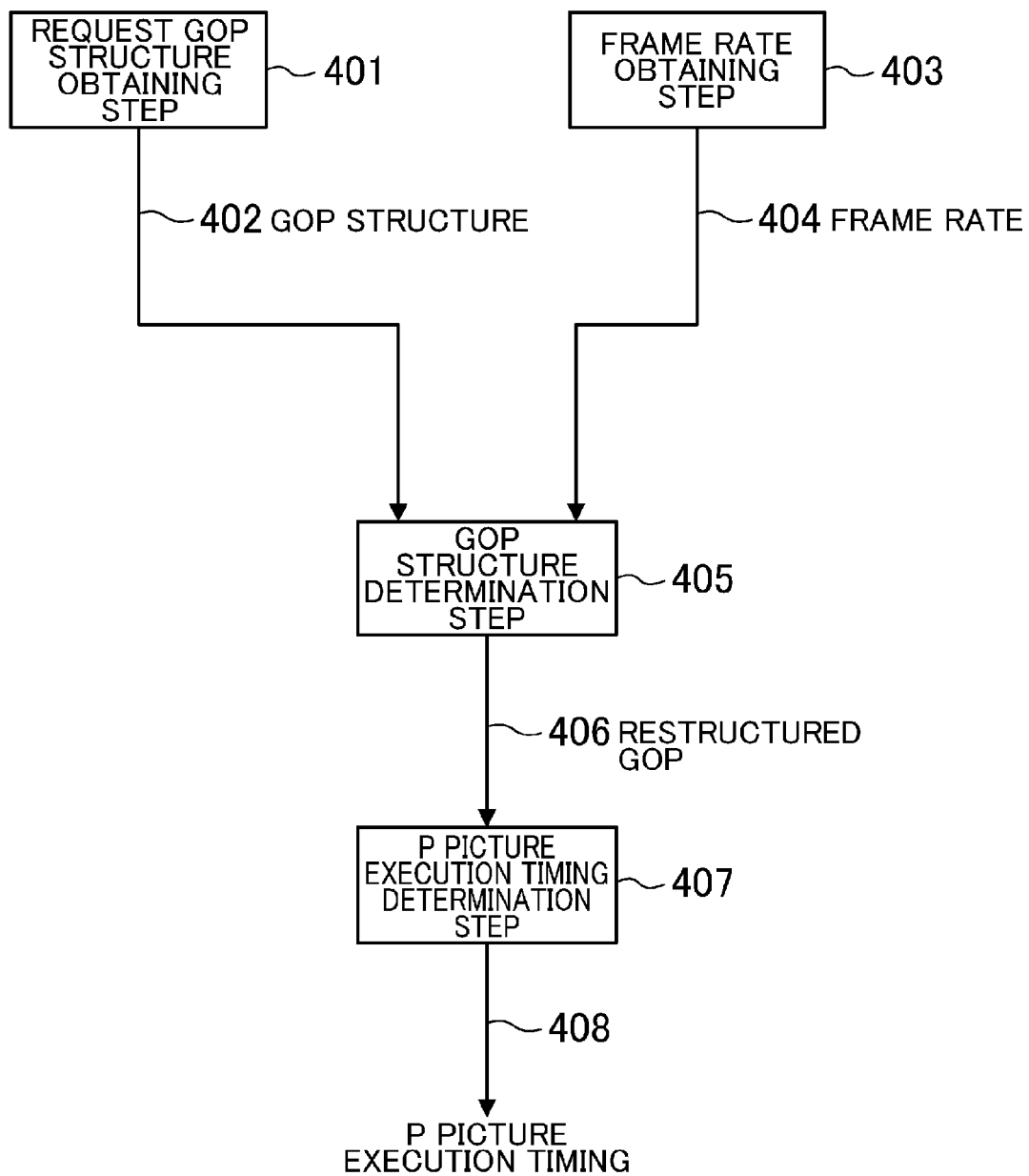
FIG. 4 is a schematic diagram illustrating another example prediction control processing according to the present disclosure.

FIG. 4 is a schematic diagram illustrating another example prediction control processing, and in particular, illustrates processing of varying a GOP structure. As illustrated in FIG. 4, the prediction control processing includes a request GOP structure obtaining step 401 of obtaining a GOP structure including a picture on which prediction processing is to be performed and outputting a GOP structure 402, a frame rate obtaining step 403 of obtaining a frame rate of each stream and outputting a frame rate 404, a GOP structure determination step 405 of outputting a restructured GOP structure 406 on the basis of the GOP structure 402 and the frame rate 404, and a P picture execution timing determination step 407 of receiving the restructured GOP structure 406 and outputting a P picture execution timing 408 as an execution timing of prediction processing for the P picture.

A case will be described as an example in which, when, as illustrated in FIG. 2A, a first stream, as a field structure, having a GOP structure in which a P picture includes two fields, a B picture includes four fields, the reference image number of the P picture is "2," and the reference image number of the B picture is "4" is compression-encoded at a frame rate of 30 fps, as illustrated in FIG. 2B, a request for compression-encoding, at a frame rate of 15 fps, a second stream, as a field structure, having a GOP structure in which a P picture includes two fields, a B picture includes four fields, the reference image number of the P picture is "1," and the reference image number of the B picture is "2" is received.

First, in the request GOP structure obtaining step 401, the GOP structure 402 illustrated in FIGS. 2A and 2B is obtained. In the frame rate obtaining step 403, the frame rate 404 of each stream is obtained. In processing performed on the first stream, "30" is outputted, and in processing performed on the second stream, "15" is outputted.

Next, processing in the GOP structure determination step 405 will be described. First, a time interval with which prediction processing is simultaneously performed is calculated from the received frame rate 404. Specifically, a greatest common divisor of each frame rate is obtained. In this case, the frame rates 404 of the first and second streams are "30" and "15," the greatest common divisor is "15." Next, when the first stream having a larger frame rate is processed, as a time interval with which prediction processing is simultaneously performed, a "picture interval with which simultaneous processing is performed" is obtained. This calculation results in 30/15=2, thus showing that prediction processing is simultaneously performed at a rate of once every two pictures.

Then, the GOP structure is determined such that an interval for the P picture included in the GOP is an "integral multiple" of the "picture interval with which simultaneous processing is performed." In this case, the "picture interval with which simultaneous processing is performed" is "2," the GOP structure 406 which has been restructured to be any one of "PBPB . . . ," "PBBBPBBB . . . ," and . . . , etc. is outputted. Along with the above-described step, prediction processing of the P picture is executed at a timing at which processing on the P picture is not simultaneously performed, and thus, the GOP may be configured such that only the first stream is reliably processed each time prediction processing is performed for the P picture of the first stream. Furthermore, the reference image number is determined by executing the first prediction control processing, and thus, reduction in the reference image number of the P picture of the first stream is not caused.

Figure 5:
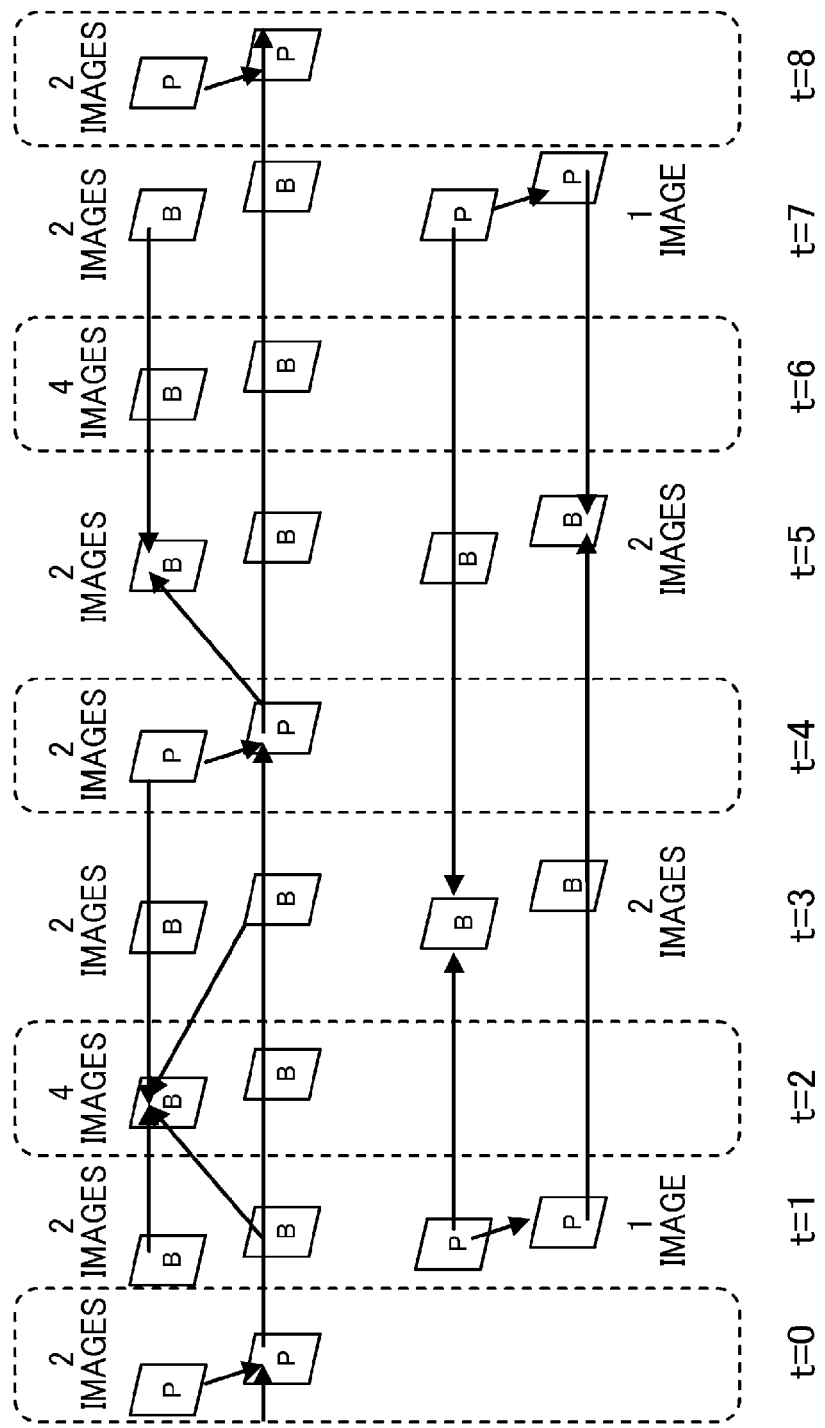
FIG. 5 is a pattern diagram illustrating the prediction control processing of FIG. 4.

FIG. 5 illustrates prediction processing performed when an interval of the P picture of the first stream is "4," i.e., when the GOP structure is restructured to be "PBBBPBBB." At the time t=0, t=4, and t=8, prediction processing for the P picture is performed. At each of the time t=0, t=4, and t=8, prediction processing is performed only on the first stream, and this shows that the reference image number 108 obtained by the first prediction control processing does not have to be reduced from "2."

As described above, since the reference image number of the P pictures that are to be target reference images is not reduced, degradation of the image quality of the P picture may be reduced, and this contributes to reduction in degradation of image quality of an entire stream.

Note that the first and second prediction control processings have been described using examples regarding an image of a field structure. However, even for an image of a frame structure, the prediction control processings may be performed according to the same aspect.

<Third Prediction Control Processing>

Figure 6:
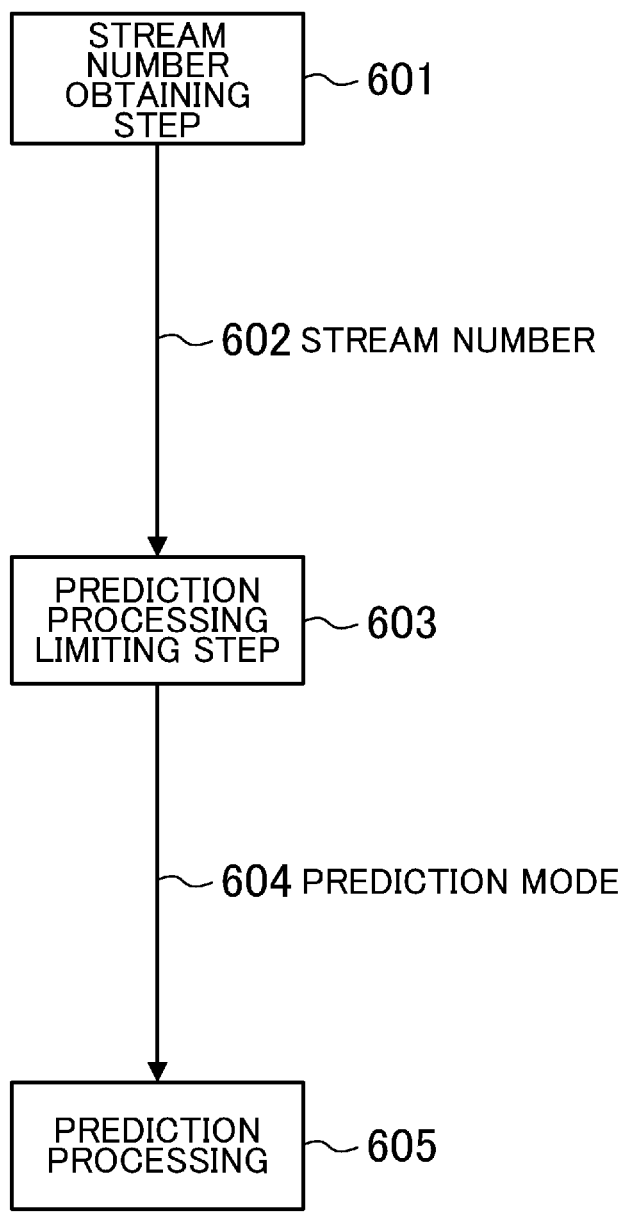
FIG. 6 is a schematic diagram illustrating still another example prediction control processing according to the present disclosure.

FIG. 6 is a schematic diagram illustrating still another example prediction control processing. As illustrated in FIG. 6, the prediction control processing includes a stream number obtaining step 601 of obtaining a stream number representing streams on which prediction processing is simultaneously performed and outputting the stream number, a prediction processing limiting step 603 of receiving as an input the stream number 602, reading a prediction mode (a search range, an intra prediction mode, and a macroblock size) from, for example, a prediction processing table illustrated in FIG. 7, and outputting the read prediction mode 604, and a prediction processing step 605 of performing prediction processing in the determined prediction mode 604.

In the stream number obtaining step 601, the number of streams on which prediction processing is simultaneously performed is obtained, and the obtained stream number 602 (i.e., for example, 2) is outputted. In the prediction processing limiting step 603, on the basis of the prediction processing table illustrated in FIG. 7, the prediction mode 604 corresponding to the received stream number is outputted. In the prediction processing table illustrated in FIG. 7, the stream number is represented in a row direction, and the prediction mode corresponding to the stream number is represented in a column direction.

In the prediction control processing, for a stream having the larger one of the respective frame rates of the plurality of streams on which prediction processing is simultaneously performed, the search range is limited such that as the stream number increases, an area of the search range reduces, in order to reduce a processing amount regarding motion search is reduced, as illustrated in FIG. 7. Also, the macroblock size is limited such that as the stream number increases, the number of selectable macroblock sizes reduces, in order to reduce the number of motion vectors that are outputted. The intra prediction mode is limited such that, as the stream number increases, the number of selectable intra prediction modes reduces, in order to reduce a processing amount of arithmetic processing for intra prediction.

As described above, for the stream having the larger one of the frame rates, a selection range of each prediction mode illustrated in FIG. 7 is limited such that, as the number of streams on which prediction processing is simultaneously performed increases, the processing amount of arithmetic processing reduces. Thus, degradation of image quality of the entire stream is reduced.

Note that as described in the first prediction control processing, for a picture on which prediction processing is not simultaneously performed, the stream number is 1, and thus, compression encoding may be performed without limiting the arithmetic amount for prediction processing. Thus, degradation of image quality may be kept minimum.

Next, reference image determination processing in prediction processing will be described with reference to the accompanying drawings.

<First Reference Image Determination Processing>

Figure 8:
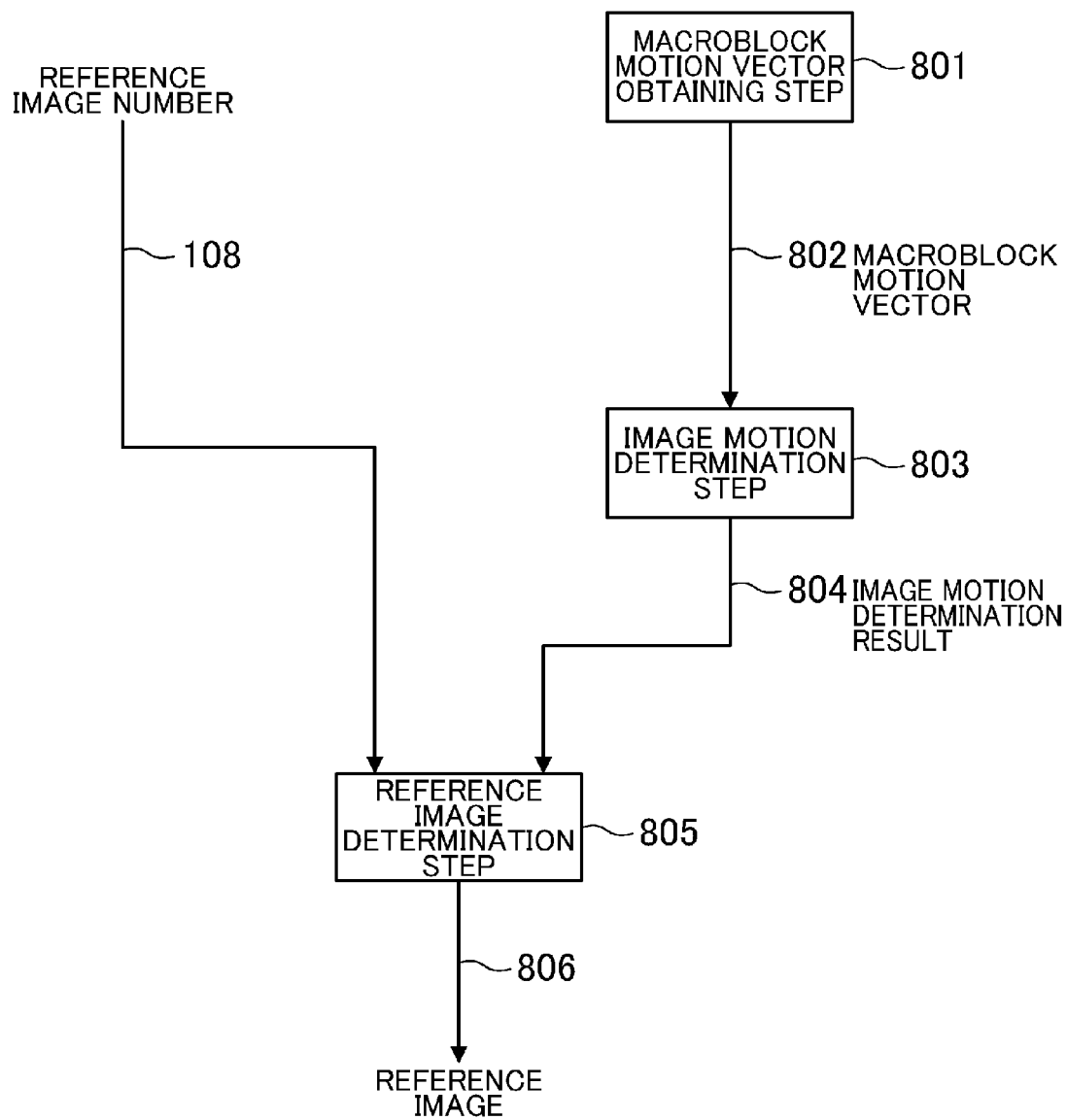
FIG. 8 is a schematic diagram illustrating an example reference image determination processing according to the present disclosure.

FIG. 8 is a schematic diagram illustrating an example reference image determination processing according to the present disclosure. The reference image determination processing includes a macroblock motion vector obtaining step 801 of obtaining a per macroblock motion vector, an image motion determination step 803 of determining whether an image stands still or is moving from the outputted macroblock motion vector 802, and a reference image determination step 805 of receiving the reference image number 108 obtained from the first prediction control processing and an image motion determination result 804 from the image motion determination step 803 and determining a reference image 806.

In the macroblock motion vector obtaining step 801, the macroblock motion vector 802 calculated at least one picture before a picture on which prediction processing is currently performed is read out. In this case, for example, the macroblock motion vector 802 may be read out from a motion vector memory (not illustrated) that holds the macroblock motion vector calculated one frame before.

Next, in the image motion determination step 803, an average motion vector for a single picture is calculated from the received macroblock motion vector 802. Assuming that horizontal components of the macroblock motion vector 802 are $x0, x1, \ldots,$ and $xn$ and vertical components thereof are y0, y1, ..., and yn, the average motion vector (MVave) is obtained by the following equation.

$$MVave=((x0+x1+ \ldots +xn)/(n+1), (y0+y1+ \ldots +yn)/(n+1))$$

Then, an absolute value of MVave is compared to a threshold Thr which is separately defined. If |MVave|≥Thr, it is determined that an image is moving and, as the image motion determination result 804, a "moving image" is outputted. If |MVave|<Thr, it is determined that an image stands still and, as the image motion determination result 804, a "not-moving image" is outputted.

Next, in the reference image determination step 805, the reference image 806 is determined on the basis of the reference image number 108 and the image motion determination result 804. Specifically, if the "moving image" is received as the image motion determination result 804, the reference images 806 corresponding to a reference image number are selected in close order to a picture on which prediction processing is performed in terms of time. If the "not-moving image" is received as the image motion determination result 804, the reference images 806 corresponding to the reference image number among images in the same phase as that of a picture on which prediction processing is performed are selected in close order to the picture in terms of time.

Figure 9A:
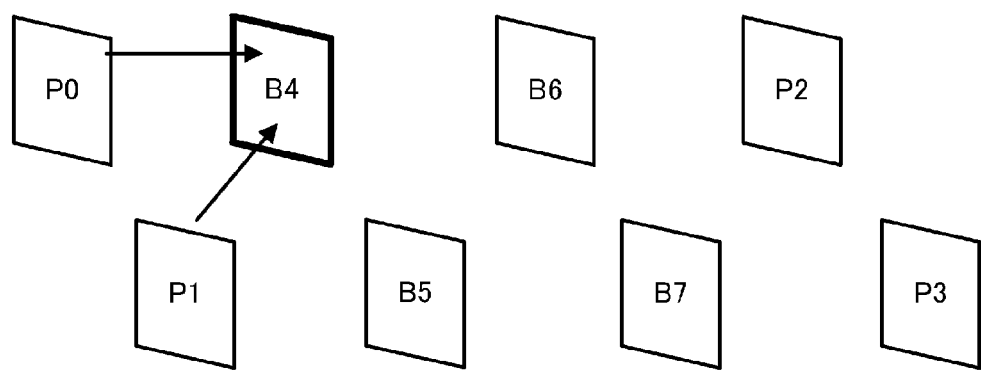
FIGS. 9A and 9B are pattern diagrams illustrating the reference image determination processing of FIG. 8.
Figure 9B:
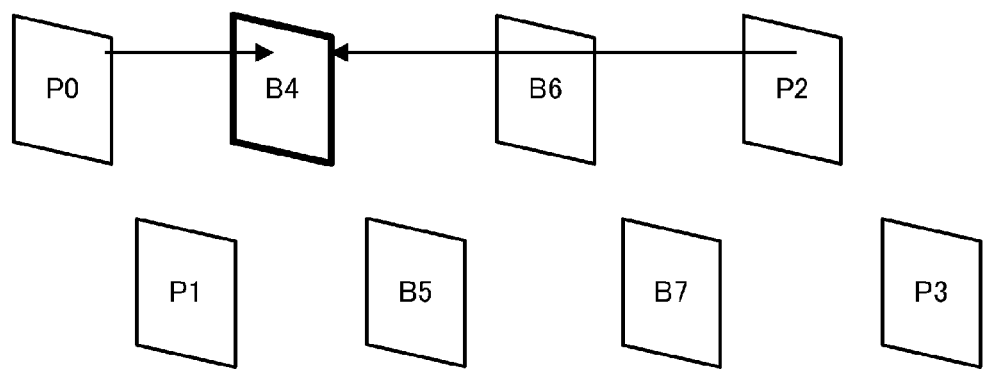

Each of FIGS. 9A and 9B illustrate an example when prediction processing for the B picture is performed. FIG. 9A illustrates a case in which the image motion determination result 804 is a "moving image" and the reference image number 108 is "2." In this case, "P1" that is the closest to "B4" in terms of time is selected. Next, "P0" that is the second closest to "B4" is selected. Thus, the reference images 806 are determined to be "P1" and "P0", etc.

FIG. 9B illustrates a case in which the image motion determination result 804 is a "not-moving image" and the reference image number 108 is "2." In this case, "B4" is an image, which is a TOP field, and thus, two images "P0" and "P2" in the TOP field in the same phase are determined as the reference images 806.

<Second Reference Image Determination Processing>

Figure 10:
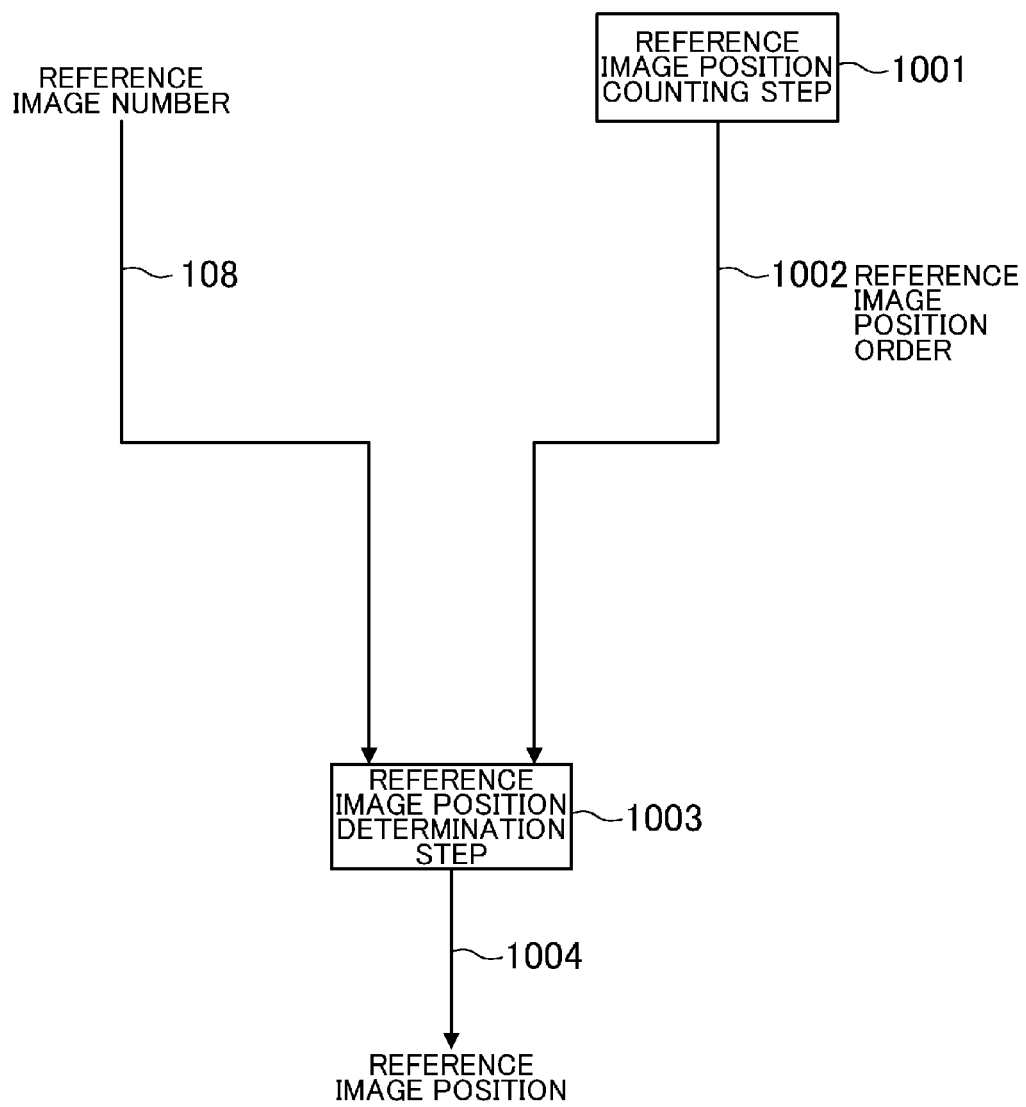
FIG. 10 is a schematic diagram illustrating another example reference image determination processing according to the present disclosure.

FIG. 10 is a schematic diagram illustrating another example reference image determination processing. The reference image determination processing includes a reference image position counting step 1001 of counting reference image positions of images selected as reference images and outputting a reference image position order 1002, and a reference image position determination step 1003 of receiving as inputs the reference image number 108 from the first prediction control processing and the reference image position order 1002 from the reference image position counting step 1001 and determining a reference image position 1004.

In the reference image position counting step 1001, for a reference image in prediction processing performed for at least one picture before a picture on which prediction processing is currently performed, positions in terms of time of reference images whose macroblocks have been selected are read out, and the number of macroblocks to which have been actually referred among the macroblocks included in the reference images are counted. In this step, for example, the positions in terms of time of the reference images may be read out from a reference image position memory (not illustrated) that holds the reference image position 1004 calculated one frame before.

Figures 11A, 11B:
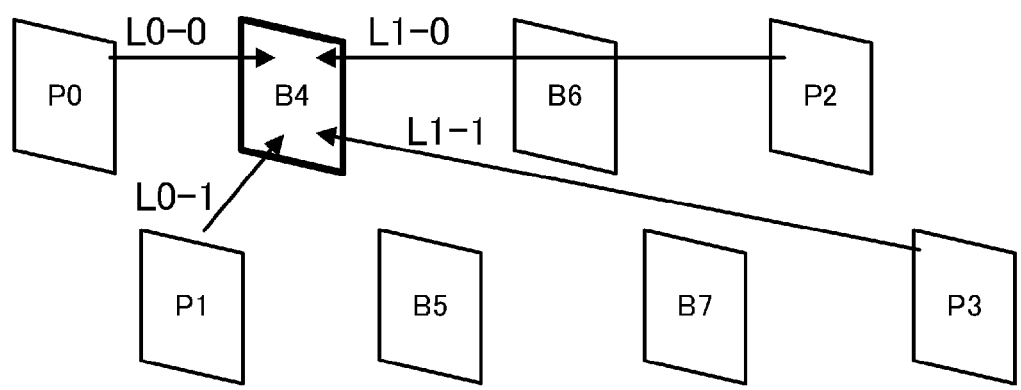
FIGS. 11A and 11B are pattern diagrams each illustrating the reference image determination processing of FIG. 10.

In the reference image position counting step 1001, as illustrated in FIG. 11A, the reference image position 1004 is defined so that the position of "P0" which is posterior to "B4" and in the same phase is "L0-0," the position of "P1" which is posterior to "B4" and in a reversed phase is "L0-1," the position of "P2" which is prior to "B4" and in the same phase is "L1-0," and the position of "P3" which is prior to "B4" and in a reversed phase is "L1-1". Next, the number of macroblocks which have been selected in prediction processing among macroblocks in each picture is counted, and the pictures are ordered in a descending order in terms of the number of the selected macroblocks in a picture.

Next, in the reference image position determination step 1003, reference images corresponding to the "reference image number" are selected according to the received reference image position order 1002. FIG. 11B illustrates example reference image positions and orders thereof.

As described above, according to the first and second reference image determination processings, a reference image which is quite similar to an image on which prediction processing is performed may be determined, and it is more likely that a motion search turns out correct. Therefore, degradation of image quality may be reduced.

Note that a program that executes the above-described three prediction control processing and two reference image determination processings may be recorded in a recording medium such as a semiconductor memory and a hard disk, etc. and the program may be read out from the recording medium and may be processed by a CPU on a computer.

<First Embodiment>

Figure 12:
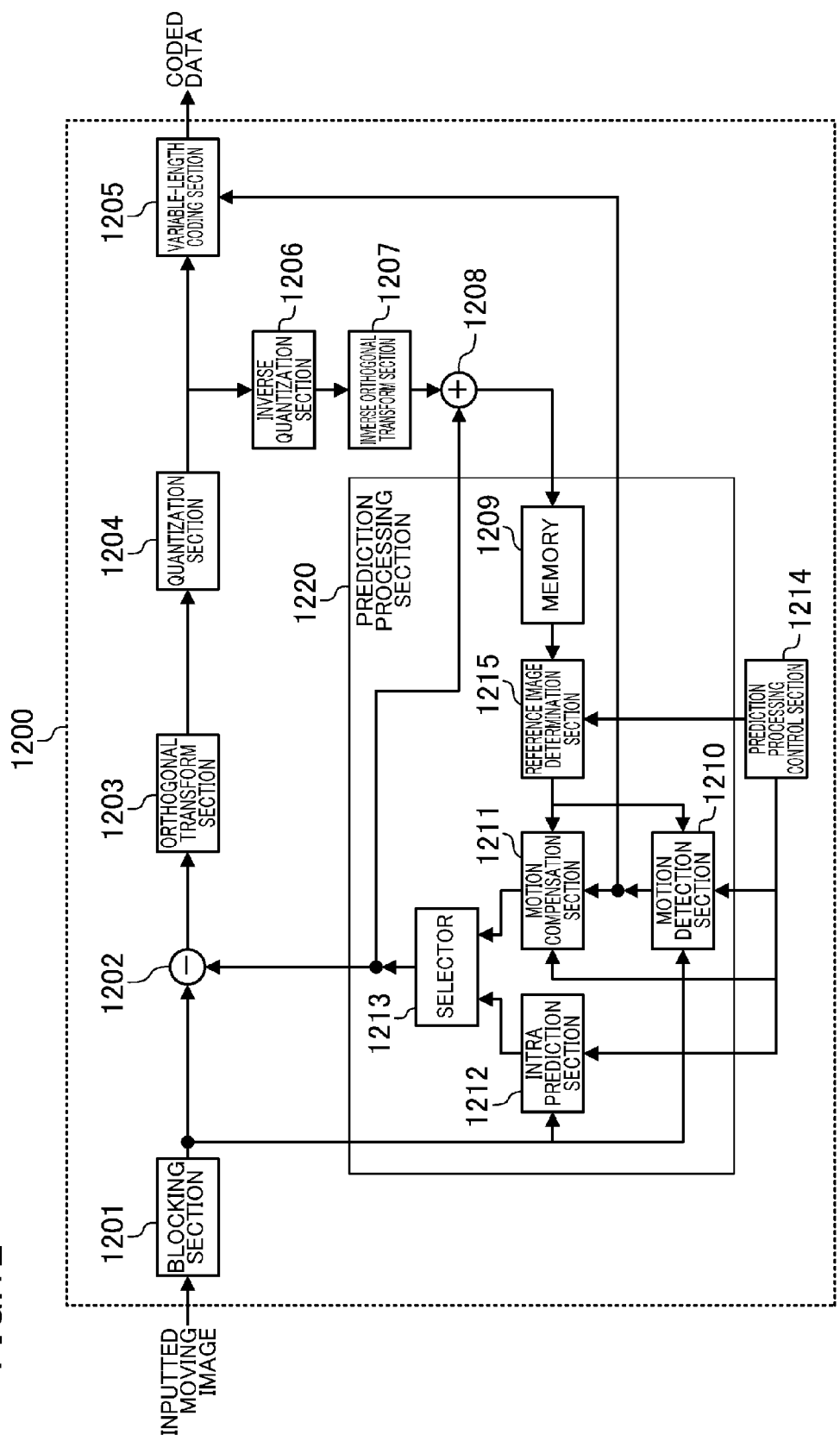
FIG. 12 is a block diagram of a moving image encoding device according to a first embodiment.

FIG. 12 is a block diagram of a moving image encoding device according to a first embodiment. A moving image encoding device 1200 according to this embodiment includes a blocking section 1201 that performs dividing on an input stream for each block, a selector 1213 that selects one of a motion prediction compensation image generated in a motion compensation section 1211 and a prediction image generated in an intra prediction section 1212 by intra/inter determination, a differentiator 1202 that obtains a difference between the image selected by the selector 1213 and a blocked stream, an orthogonal transform section 1203 that performs orthogonal transform of the difference, a quantization section 1204 that performs quantization on a transform coefficient obtained by the orthogonal transform section 1203, a variable-length coding section 1205 that variable-length codes a quantization coefficient obtained by the quantization section 1204 and a motion vector from a motion detection section 1210, an inverse quantization section 1206 that performs inverse quantization of the quantization coefficient obtained by the quantization section 1204, an inverse orthogonal transform section 1207 that performs inverse orthogonal transform of a transform coefficient obtained by the inverse quantization section 1206, an adder 1208 that adds an image obtained by the inverse orthogonal transform section 1207 and an image selected by the selector 1213 together, a memory 1209 that stores an image outputted from the adder 1208, a reference image determination section 1215 that determines a reference image from a plurality of images stored in the memory 1209, the motion detection section 1210 that performs motion detection using a pixel in the reference image determined by the reference image determination section 1215, and the motion compensation section 1211 that performs motion compensation on the basis of a motion vector detected by the motion detection section 1210 and outputs the motion prediction compensation image. A prediction processing section 1220 includes the memory 1209, the motion detection section 1210, the motion compensation section 1211, the intra prediction section 1212, the selector 1213, and the reference image determination section 1215.

In the moving image encoding device 1200, a prediction processing control section 1214 performs the above-described prediction control processing and instructs a prediction processing section 1220 to reduce the arithmetic amount of prediction processing only for a stream having the larger one of frame rates. The prediction processing section 1220 performs prediction processing and the above-described reference image determination processing in accordance with the instruction. Specifically, the prediction processing control section 1214 instructs the intra prediction section 1212 to limit a selection range of a prediction mode. Moreover, the prediction processing control section 1214 instructs the motion detection section 1210 and the motion compensation section 1211 to limit a search range regarding motion vector calculation and a selection range of a macroblock size. Furthermore, the prediction processing control section 1214 instructs the reference image determination section 1215 to reduce the number of reference images.

As described above, according to this embodiment, even when a plurality of streams are simultaneously compression-encoded, degradation of image quality may be reduced as much as possible.

Note that the moving image encoding device 1200 is typically implemented as a large scale integration (LSI) that is an integrated circuit. Each constituent element of the moving image encoding device 1200 may be individually mounted on a single chip, or some or all of constituent elements of the moving image encoding device 1200 may be mounted on a single chip. Moreover, although the moving image encoding device 1200 has been described as an LSI herein, the moving image encoding device 1200 may be implemented as an integrated circuit (IC), a system LSI, a super LSI, or an ultra LSI depending on the degree of integration.

An integration method is not limited to LSI, but may be implemented as a dedicated communication circuit or a general-purpose processor, etc. A field programmable gate array (FPGA) which is programmable after fabricating an LSI and a reconfigurable processor in which connection and setting of a circuit cell in an LSI are reconfigurable may be used. Furthermore, with the progress of semiconductor techniques or a new technique derived therefrom, etc., if an integrated circuit technique which will replace the LSI technique emerges, integration of a function block may be of course performed using the technique.

<Second Embodiment>

Figure 13:
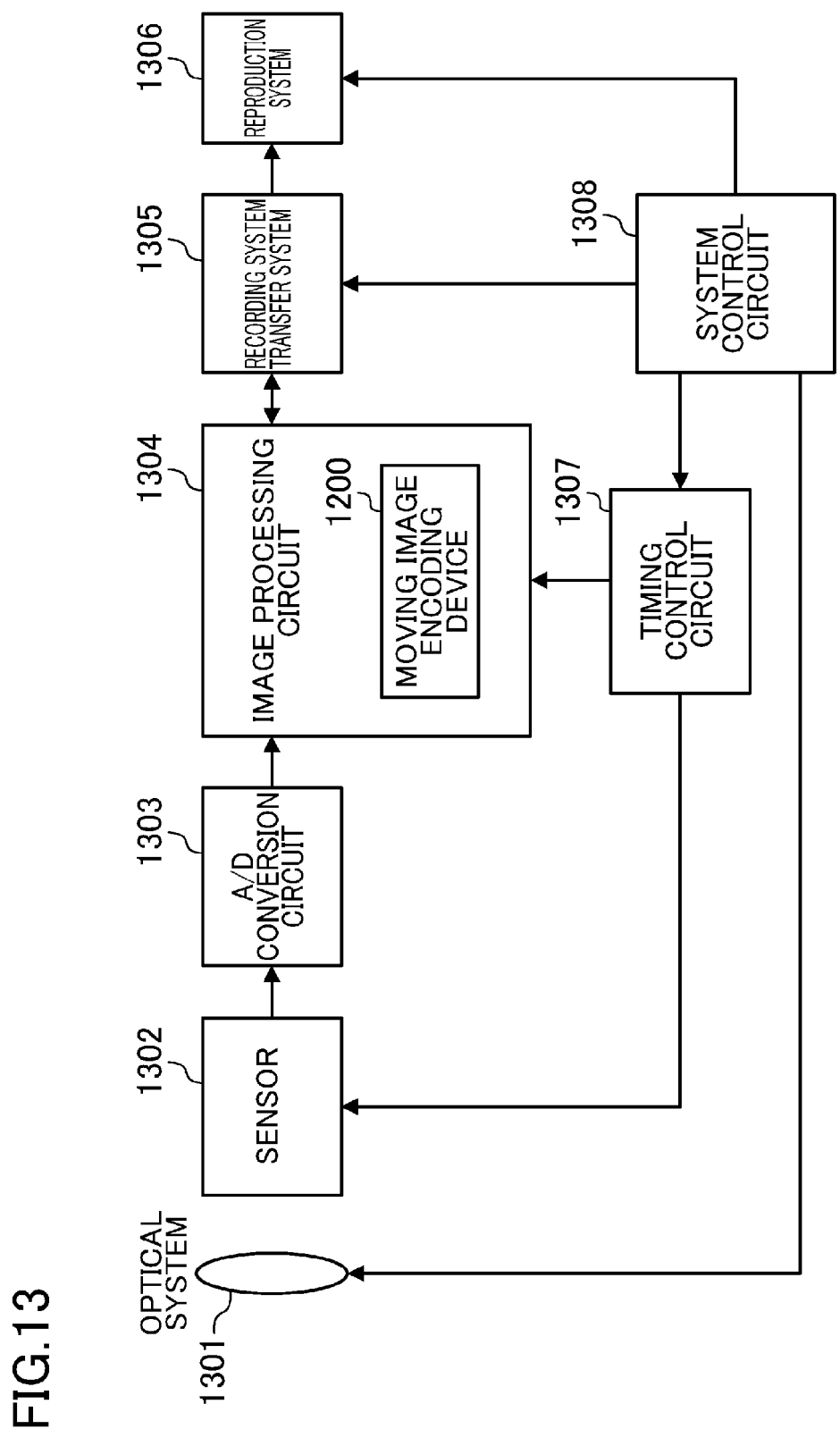
FIG. 13 is a block diagram of an imaging system according to a second embodiment.
Figure 14:
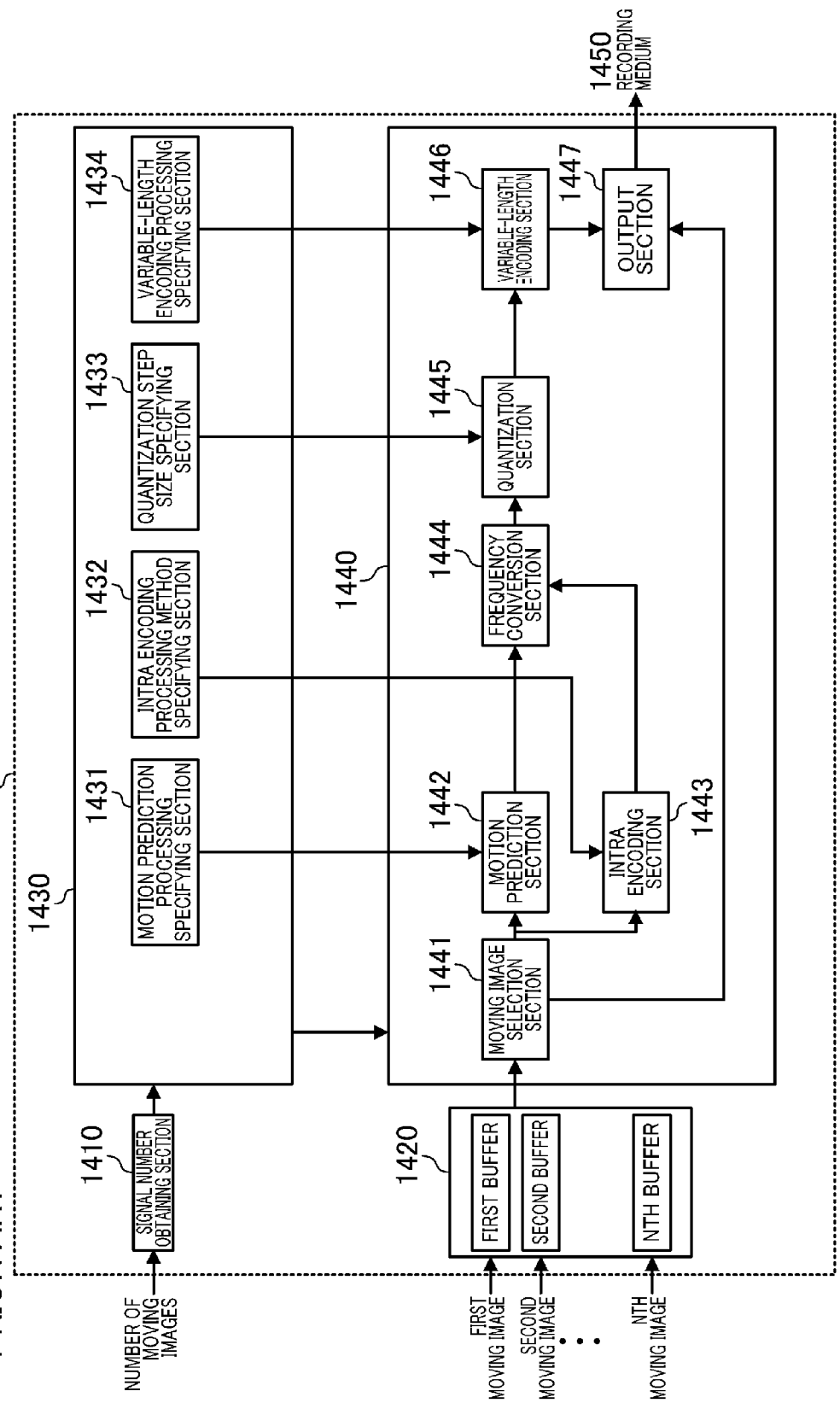
FIG. 14 is a block diagram of a known moving image encoding device.

FIG. 13 is a block diagram illustrating an example imaging system according to a second embodiment. An imaging system (video system) according to this embodiment is applicable to a network camera and the like using the above-described moving image encoding method.

In the imaging system illustrated in FIG. 13, an image light which has entered into the imaging system through an optical system 1301 forms an image on a sensor 1302 and is photoelectric-converted. An analog signal obtained through photoelectric conversion is converted to a digital value by an analog/digital (A/D) conversion circuit 1303, and then, is received by an image processing circuit 1304 including, for example, the moving image encoding device 1200 illustrated in FIG. 12. In the image processing circuit (an image processing section) 1304, luminance/color (Y/C) processing, edge processing, image scaling, and image compression/expansion processing such as joint photographic experts group (JPEG) and moving picture experts group (MPEG), etc. and image compressed stream control, etc. are performed. A signal which has undergone image processing is recorded in media by a recording system/transfer system 1305 and transmitted through the Internet and the like. The recorded or transferred signal is reproduced by a reproduction system 1306. The sensor 1302 and the image processing circuit 1304 are controlled by a timing control circuit 1307, and the optical system 1301, the recording system/transfer system 1305, the reproduction system 1306, and the timing control circuit 1307 are individually controlled by a system control circuit 1308.

Note that, in the imaging system illustrated in FIG. 13, a camera machine or the like in which an image light from the optical system 1301 is photoelectric-converted by the sensor 1302 and is received by the A/D conversion circuit 1303 has been described. However, the present disclosure is not limited thereto but, other than that, an analog video image input of an audio visual equipment such as a television set and the like may be directly received by the A/D conversion circuit 1303.

A moving image encoding method and a moving image encoding device according to the present disclosure are useful for a camera system used in a network camera and a security camera, etc. in which a plurality of moving image signals have to be simultaneously compressed.

What is claimed is:

1. A moving image encoding method comprising:
   encoding a difference between a first moving image and a corresponding motion compensated prediction image; and
   encoding a difference between a second moving image and a corresponding motion compensated prediction image,
   wherein, when prediction processing for the first moving image and prediction processing for the second moving image whose frame rate is smaller than a frame rate of the first moving image are simultaneously performed, an arithmetic amount is reduced only for the first moving image, and prediction processing is performed,
   the method further comprises:
   changing, in order not to simultaneously perform P picture prediction processing for the first moving image and the prediction processing for the second moving image, a group of pictures (GOP) structure in accordance with the P picture prediction processing,
   wherein, in the changing of the GOP structure, a timing of the P picture prediction processing is determined on the basis of a value obtained by dividing the frame rate of the first moving image by a greatest common divisor of each of the frame rates of the first and second moving images.

2. The method of claim 1, wherein
   when the prediction processings for the first and second moving images are simultaneously performed, only a number of reference images for the first moving image is reduced, and the prediction processings are performed.

3. The method of claim 2, further comprising:
   performing motion determination regarding the first moving image; and
   determining the number of reference images that are to be referred in prediction processing that is subsequently performed to the prediction processing for the first moving image on the basis of a result of the motion determination and the number of reference images.

4. The method of claim 2, further comprising
determining a reference image that is to be referred to in prediction processing that is subsequently performed to the prediction processing for the first moving image on the basis of a number of macroblocks referred to in prediction processing among the plurality of macroblocks included in the reference images, a positional relationship of the reference images in terms of time, and the number of reference images.

5. The method of claim 1, wherein
when the prediction processings for the first and second moving images are simultaneously performed, a search range regarding calculation of a motion vector relating to each of macroblocks is limited only for the first moving image, and the prediction processings are performed.

6. The method of claim 1, wherein
when the prediction processings for the first and second moving images are simultaneously performed, a selection range of macroblock sizes regarding blocking is limited only for the first moving image, and the prediction processings are performed.

7. The method of claim 1, wherein
when the prediction processings for the first and second moving images are simultaneously performed, a selection range of a prediction mode regarding intra prediction is limited only for the first moving image, and the prediction processings are performed.

8. A machine-readable non-transitory recording medium that stores a program configured to cause a computer to realize the moving image encoding method of claim 1.

9. A moving image encoding device that encodes a difference between a moving image and a corresponding motion compensated prediction image, the device comprising:
a prediction processor to perform prediction processing on a plurality of moving images; and
a controller to instruct, when prediction processing for a first moving image and prediction processing for a second moving image whose frame rate is smaller than a frame rate of the first moving image are simultaneously performed, the prediction processor reduces an arithmetic amount regarding prediction processing only for the first moving image,
wherein the controller has a function of changing, in order not to simultaneously perform P picture prediction processing for the first moving image and the prediction processing for the second moving image, a group of pictures (GOP) structure in accordance with the P picture prediction processing, and
the controller determines a timing of the P picture prediction processing on the basis of a value obtained by dividing the frame rate of the first moving image by a greatest common divisor of the frame rates of the first and second moving images.

10. The device of claim 9, wherein
when the prediction processings for the first and second moving images are simultaneously performed, the controller instructs the prediction processor to reduce a number of reference images in prediction processing only for the first moving image.

11. The device of claim 10, wherein
the prediction processor includes a reference image determination section to perform motion determination regarding the first moving image and determine a reference image in prediction processing for the first moving image, which is subsequently performed to the prediction processing, on the basis of a result of the motion determination and the number of reference images.

12. The device of claim 10, wherein
the prediction processor includes a reference image determination section to determine a reference image in prediction processing for the first moving image, which is subsequently performed to the prediction processing, on the basis of a number of macroblocks referred to in prediction processing among the plurality of macroblocks included in the reference images, a positional relationship of the reference images in terms of time, and the number of reference images.

13. The device of claim 9, wherein
the prediction processor performs prediction processing using a motion vector of each of macroblocks of the first and second moving images, and
when the prediction processings for the first and second moving images are simultaneously performed, the controller instructs the prediction processor to limit a search range regarding calculation of a motion vector only for the first moving image.

14. The device of claim 9, wherein
the prediction processor performs prediction processing using a macroblock having a size selected from a plurality of macroblock sizes of the first and second moving images, and
when the prediction processings for the first and second moving images are simultaneously performed, the controller instructs the prediction processor to limit a selection range of macroblock sizes regarding blocking only for the first moving image.

15. The device of claim 9, wherein
the prediction processor has an intra prediction section to perform prediction processing in accordance with a prediction mode selected from a plurality of prediction modes regarding intra prediction, and
when the prediction processings for the first and second moving images are simultaneously performed, the controller instructs the intra prediction section to limit a selection range of prediction modes regarding the first moving image.

16. An imaging system comprising: the moving image encoding device of claim 9.

* * * * *